United States Patent
Vrabel et al.

(10) Patent No.: US 11,210,186 B2
(45) Date of Patent: Dec. 28, 2021

(54) ERROR RECOVERY STORAGE FOR NON-ASSOCIATIVE MEMORY

(71) Applicant: Arm Limited, Cambridge (GB)

(72) Inventors: Peter Vrabel, Cambridge (GB); Alan Jeremy Becker, Bushey (GB)

(73) Assignee: Arm Limited, Cambridge (GB)

( * ) Notice: Subject to any disclaimer, the term of this patent is extended or adjusted under 35 U.S.C. 154(b) by 222 days.

(21) Appl. No.: 16/295,226

(22) Filed: Mar. 7, 2019

(65) Prior Publication Data

US 2020/0285550 A1   Sep. 10, 2020

(51) Int. Cl.
| | | |
|---|---|---|
| *G06F 11/00* | (2006.01) | |
| *G06F 11/20* | (2006.01) | |
| *G06F 11/14* | (2006.01) | |
| *G06F 12/02* | (2006.01) | |
| *G06F 12/0897* | (2016.01) | |
| *G06F 11/10* | (2006.01) | |
| *G06F 12/0817* | (2016.01) | |

(52) U.S. Cl.
CPC ...... *G06F 11/2017* (2013.01); *G06F 11/1064* (2013.01); *G06F 11/1435* (2013.01); *G06F 12/0292* (2013.01); *G06F 12/0897* (2013.01); *G06F 12/0826* (2013.01)

(58) Field of Classification Search
CPC ............. G06F 11/1056; G06F 11/1064; G06F 11/1072; G06F 12/0895; G06F 12/0897; G06F 12/10; G06F 13/1668; G06F 11/1008; G06F 11/1012; G06F 11/1435; G06F 12/0292; G06F 12/0826
See application file for complete search history.

(56) References Cited

U.S. PATENT DOCUMENTS

| | | | | |
|---|---|---|---|---|
| 4,525,780 A | * | 6/1985 | Bratt | G01R 31/318505 |
| | | | | 711/163 |
| 6,546,501 B1 | * | 4/2003 | Hataida | G06F 11/1064 |
| | | | | 711/133 |
| 6,708,294 B1 | * | 3/2004 | Nakao | G06F 11/1064 |
| | | | | 714/42 |
| 8,527,544 B1 | * | 9/2013 | Colgrove | G06F 3/0608 |
| | | | | 707/791 |
| 2004/0210799 A1 | * | 10/2004 | Cargnoni | G06F 11/1064 |
| | | | | 714/42 |

(Continued)

*Primary Examiner* — Marc Duncan
(74) *Attorney, Agent, or Firm* — Nixon & Vanderhye P.C.

(57) ABSTRACT

An apparatus comprises a non-associative memory comprising a plurality of storage locations, and error recovery storage to store at least one error recovery entry providing a recovery value for a corresponding storage location of the non-associative memory. Control circuitry is responsive to a non-associative memory read request specifying a target address of a storage location of the non-associative memory, when the error recovery storage includes a valid matching error recovery entry for which the corresponding storage location is the storage location identified by the target address, to return the recovery value stored in the valid matching error recovery entry as a response to the non-associative memory read request, instead of information stored in the storage location identified by the target address. This enables the apparatus to continue to function even if hard errors occur in a storage location of the non-associative memory.

17 Claims, 7 Drawing Sheets

(56) References Cited

U.S. PATENT DOCUMENTS

| | | | |
|---|---|---|---|
| 2008/0163008 A1* | 7/2008 | Jacob | G06F 11/1064 |
| | | | 714/699 |
| 2010/0107037 A1* | 4/2010 | Pelley, III | G06F 11/1064 |
| | | | 714/763 |
| 2015/0067286 A1* | 3/2015 | Colgrove | G06F 3/0688 |
| | | | 711/162 |
| 2016/0041791 A1* | 2/2016 | Hwang | G06F 3/0604 |
| | | | 711/154 |
| 2018/0089137 A1* | 3/2018 | Ooi | G06F 13/4282 |
| 2018/0157590 A1* | 6/2018 | Persson | G06F 12/0833 |
| 2019/0087327 A1* | 3/2019 | Kanno | G06F 12/0261 |
| 2019/0205244 A1* | 7/2019 | Smith | G06F 12/12 |
| 2019/0377634 A1* | 12/2019 | Jung, II | G11C 29/52 |
| 2020/0065243 A1* | 2/2020 | Walker | G06F 12/0813 |
| 2020/0327063 A1* | 10/2020 | Kang | G06F 11/3037 |

\* cited by examiner

ERROR RECOVERY STORAGE FOR NON-ASSOCIATIVE MEMORY

BACKGROUND

Technical Field

The present technique relates to the field of memory storage.

Technical Background

An integrated circuit or data processing apparatus may have a memory for storing information (which could be data or instructions). Information stored in the memory may be prone to hard errors or soft errors. Soft errors may be temporary corruption of information within a storage element which occurs even though the hardware circuitry of the storage element is still capable of operating correctly. For example, information may be corrupted due to a physical particle, such as an alpha particle or neutron, striking the circuitry of the storage element which may cause a stored bit of information to switch states leading to corruption of the stored information. After a soft error has occurred, when a new value is subsequently re-written to the same storage element, then that new value will be correct and the soft error no longer arises. In contrast, a hard error may be caused by a physical error in the underlying circuit hardware, which could be due to a defect arising in manufacturing or due to deterioration over time e.g. due to electromigration. Once a hard error has arisen then it is no longer possible to reliably store information to that storage element, because even if the data is re-written, the hard error may occur again. A hard error may cause a bit of information stored in a given storage element to be permanently stuck at 0 or stuck at 1 regardless of what information is written to the storage element.

SUMMARY

At least one example provides an apparatus comprising: a non-associative memory comprising a plurality of storage locations; error recovery storage to store at least one error recovery entry providing a recovery value for a corresponding storage location of the non-associative memory; and control circuitry responsive to a non-associative memory read request specifying a target address of a storage location of the non-associative memory, when the error recovery storage includes a valid matching error recovery entry for which the corresponding storage location is the storage location identified by the target address, to return the recovery value stored in said valid matching error recovery entry as a response to the non-associative memory read request, instead of information stored in the storage location identified by the target address.

At least one example provides an apparatus comprising: means for non-associatively storing information, comprising a plurality of storage locations; means for storing at least one error recovery entry providing a recovery value for a corresponding storage location of the means for non-associatively storing information; and means for responding to a non-associative memory read request specifying a target address of a storage location of the means for non-associatively storing information, when the means for storing at least one error recovery entry includes a valid matching error recovery entry for which the corresponding storage location is the storage location identified by the target address, by returning the recovery value stored in said valid matching error recovery entry as a response to the non-associative memory read request, instead of information stored in the storage location identified by the target address.

At least one example provides a method for controlling access to a non-associative memory comprising a plurality of storage locations; comprising: receiving a non-associative memory read request specifying a target address of a storage location of the non-associative memory; looking up the target address in error recovery storage comprising at least one error recovery entry providing a recovery value for a corresponding storage location of the non-associative memory; and when the error recovery storage includes a valid matching error recovery entry for which the corresponding storage location is the storage location identified by the target address, returning the recovery value stored in said valid matching error recovery entry as a response to the non-associative memory read request, instead of information stored in the storage location identified by the target address.

Further aspects, features and advantages of the present technique will be apparent from the following description of examples, which is to be read in conjunction with the accompanying drawings.

DESCRIPTION OF EXAMPLES

A data processing apparatus may have a non-associative memory which has a number of storage locations for storing information. The stored information could be either data or instructions. A non-associative memory is a memory for which, when an access request is received specifying an address of information to be accessed from the non-associative memory, there is a single physical location within the non-associative memory which is allowed to store the information corresponding to the specified address. Hence there is either a one-to-one or a many-to-one mapping between the address specified in the request and the physical storage location storing the corresponding information. This contrast with associative memories for which there are multiple physical storage locations which could store the data or instructions identified by a given address specified in the request sent to the memory.

A non-associative memory may be prone to soft errors or hard errors as discussed above. If a non-associative memory gets an uncorrectable soft error at a given physical storage location, the information stored in that physical storage location may be lost, but a subsequent write to the storage location can be performed and then the written information may validly be read in future. If the non-associative memory gets a hard error at a given physical storage location, then every subsequent read to that physical storage location may encounter an error, which could be correctable based on error correction codes, or may be uncorrectable either if no error correction code capability is provided or if the error is such that it is beyond the capability of the error correction code. For example, if two or more bits within a value protected by a given error correction code switch states, then the error may not be correctable with some types of error correction codes. If a non-associative memory gets an uncorrectable hard error, then any device or software that relies on information stored in that memory may be rendered inoperable because it might repeatedly lose information (data or instructions) that is required for correct function. Unlike for an associative memory, it would not be possible to handle the hard error by instead storing the corresponding information in a different physical location of the memory, because with a non-associative memory there is only one allowed physical storage location for a given address supplied in the request to the non-associative memory.

In the techniques discussed below, error recovery storage is provided to store at least one error recovery entry which provides a recovery value for a corresponding storage location of the non-associative memory. Control circuitry is provided, which in response to a non-associative memory read request specifying a target address of a storage location of the non-associative memory, when the error recovery storage includes a valid matching error recovery entry for which the corresponding storage location is the storage location identified by the target address, returns the recovery value stored in the valid matching error recovery entry as a response to the non-associative memory read request instead of information stored in the information storage location identified by the target address. This allows the apparatus to continue to operate even in the presence of uncorrectable hard errors in certain storage errors in the non-associative memory. If a given physical storage location of the non-associative memory encounters a hard error, then the control circuitry may effectively substitute a corresponding error recovery entry for that erroneous storage location, with read requests obtaining their response value from the recovery entry corresponding to the erroneous storage location, instead of using the information stored in the erroneous storage location itself. This can prolong the effective lifetime of a data processing device by enabling the device to continue to be operational even if some storage locations of the non-associative memory encounter hard errors.

Each error recovery entry may comprise a validity field and an address field, which can be used by the control circuitry to determine whether the error recovery storage includes a valid matching error recovery entry associated with the target address. The valid matching recovery entry may comprise a error recovery entry for which the validity field indicates that the error recovery entry is valid and the address field indicates an address matching the target address.

Each error recovery entry has at least one poison field, with each poison field indicative of whether a corresponding portion of the recovery value is usable as a response to a non-associative memory read request. Some implementations may provide only a single poison field which corresponds to the entire recovery value, while other approaches may provide multiple poison fields each corresponding to a respective portion of the recovery value. The recovery value may be unusable as a response to a non-associative memory read request, for example, because when the initial error was detected in the corresponding error recovery entry, any error correction codes provided were unable to correct the error and so the information stored in the erroneous entry could not be trusted. In this case, by indicating with the poison field that the recovery value is unusable, the error recovery entry can still be used to indicate that there is an error in the corresponding storage location of the non-associative memory, but the control circuitry can determine that a recovery value (or portion of the recovery value) corresponding to the poison field should not be used as a read response.

Hence, in response to non-associative memory read request, when the at least one poison field of the valid matching error recovery entry indicates that one or more required portions of the recovery value required for responding to the non-associative memory read request are all usable then those one or more required portions may be returned as the response to the non-associative memory read request. On the other hand, when the at least one poison field indicates that at least one required portion of the recovery value required for responding to the non-associative memory read request is unusable then an error indication can be returned. Some read requests may not require the entire word corresponding to the target address to be returned. For example it is possible to issue half word or byte-size read requests which only require a fraction of a full word to be returned. Hence, for such requests if the poison field corresponding to the portion of the word which is not required for handling the read request indicates that the corresponding portion is unusable, this may not preclude other portions of the recovery value which are indicated as useable being returned as a valid read response.

Even if the recovery value in a given error recovery entry is marked as at least partially unusable by the corresponding poison field(s), it is possible that subsequently a non-associative memory write request may be issued that specifies a write target address which corresponds to the storage location of the non-associative memory which is identified as the location corresponding to the error recovery entry. In this case, if part of the information in the erroneous storage location is to be overwritten, it is possible to update the corresponding portion of the recovery value in the corresponding error recovery entry, and then such updated portions can then become useable again so that it is possible to update the corresponding poison fields. Hence, even if at the time when a given error was detected that error was uncorrectable, and so initially the error recovery entry specified at least one unusable portion of the data value, following a subsequent write to the non-associative memory the new value for the location may be used as the recovery value to be returned for subsequent read requests to the same address.

Hence, in response to a non-associative memory write request which specifies a write target address and a write value to be written to the storage location identified by the write target address, when the error recovery storage includes a valid matching error recovery entry for which the corresponding storage location is the storage location identified by the write target address, the recovery stored in that valid matching recovery entry may be updated based on the write value specified by the non-associative memory write request.

Also, in response to the non-associative memory write request, when a given poison field of the valid matching error recovery entry indicates that a given portion of the recovery value is unusable, and the non-associative memory write request requests overwriting of all bits within a portion of the storage location corresponding to the given portion of the recovery value, then as well as updating the given portion of the recovery value based on the write value, the circuitry may also update the given poison field to indicate that the given portion of the recovery value is now usable. This enables subsequent reads to make use of the error recovery value as a replacement for the information in the corresponding location in the non-associative memory which encountered the error, rather than merely detecting that an error is present, enabling forward progress to be made.

In response to a non-associative memory write request for which the error recovery storage includes a valid matching error recovery entry, as well as updating the recovery value in the valid matching error recovery entry, the write value can also be written to the storage location of the non-associative memory identified by the write target address. While one might expect that if the error recovery entry is being used to provide the recovery value for a given address of the non-associative memory, it would not be necessary to also update the corresponding location in the non-associative memory itself, in fact it can be beneficial to update both the original location in the non-associative memory and the recovery value in the corresponding error recovery entry. This is because when an error is initially detected and the error recovery entry is allocated for that address, it may not be known whether that error was caused by a soft error or hard error. If the error is a soft error, then it would only be the information stored in the corresponding storage location at the time of the error occurring that would be corrupted, and if a subsequent write request overwrites that information then the new write value would be correct. As the error recovery storage may have a finite number of error recovery entries, and so from time to time it may be needed to evict a previously allocated entry to make way for an entry corresponding to a storage location which has newly encountered an error, then by ensuring that writes update both the original physical location in the non-associative memory and the corresponding error recovery value, then this means that if the original error was a soft error this new write will have removed the soft error and so even if the corresponding error recovery entry was subsequently evicted, then the apparatus can subsequently continue with correct operation when reads subsequently target the original storage location of the non-associative memory which now stored a correct value.

The apparatus may have error detection circuitry to detect errors in information stored in the non-associative memory, e.g. based on error detecting codes or error correcting codes. In response to detection of an error in information stored in a given storage location in the non-associative memory, when the error is correctable and the error recovery storage includes at least one error recovery entry that is updatable by the control circuitry, the control circuitry may update the error recovery storage to provide a valid error recovery entry for which the corresponding storage location is the given storage location which encountered the error and the recovery value is an error-corrected value of the information stored in the given storage location. On the other hand, if the error was uncorrectable then while the error recovery storage may still be updated to provide a valid error recovery entry, in this case the at least one poison field may be set to specify that at least part of the recovery value is unusable. If a form of error detecting code or error correcting code is provided which is able to distinguish the location of the error to a particular portion of the value given in the particular storage location, then it may be possible for only some of the poison fields to specify that corresponding parts of the recovery value are unusable, with other parts of the recovery value being identified as usable if these correspond to portions of the information in the given storage location for which it was possible to correct the error. Alternatively, in implementations where either there is only a single poison field per error recovery entry, or where the error detection/correction capability is such that it was not possible to pinpoint the exact location of the error within the given storage location, then all poison fields for the newly allocated valid error recovery entry could be set to specify that the corresponding portions of the recovery value are unusable.

As mentioned above, the total number of error recovery entries provided in the error recovery storage may be finite. For example, for some systems the number of error recovery entries could be as few as one or two. Alternatively, if desired a greater number of error recovery entries could be provided. The chosen number of error recovery entry supported may be selected to provide a balance between the increased device lifetime achieved by providing additional error recovery entries to permit hard errors to be patched over, and the hardware cost of the power and circuit area associated with providing the storage for the error recovery entries and the corresponding circuitry for looking up whether a given address matches against each of those error recovery entries and for updating error recovery entries when errors are detected or when read and write requests are issued to the non-associative memory.

For storage locations subject to soft errors, it may be sufficient that an error recovery entry is allocated for a time but then eventually that error recovery entry is evicted as eventually it is likely that another write may occur to the same storage location, at which point it will be acceptable to carry on servicing read or write requests using the physical location in the non-associative memory itself rather than needing an error recovery entry. However, for locations subject to hard errors it will not be possible to service requests validly using the erroneous storage location of the non-associative memory, and so it may be desirable to permanently retain an error recovery entry in the error recovery storage, which corresponds to a location identified as having a hard error. Hence, each error recovery entry may comprise a lock field which indicates whether the error recovery entry is allowed to be evicted from the error recovery storage by the control circuitry. When attempting to allocate a new entry to the error recovery storage, the control circuitry may not be allowed to evict an error recovery entry for which the lock field is set, and so is restricted to selecting for eviction an error recovery entry for which the lock field is clear. The lock field for a given error recovery entry may be restricted to being updated by software executed by processing circuitry. Typically, it may be relatively difficult for hardware to detect whether an error arising in a given storage location was caused by a soft error or a hard error. To be able to distinguish hard and soft errors, it can be useful to run certain software test algorithms which perform sequences of memory reads and writes designed to probe whether the same storage location repeatedly encounters errors, in which case it is more likely that the error was caused by a hard error. Hence, by preventing the lock field of a given error recovery entry being updatable by the control circuity in hardware, this ensures that once a given storage location of the non-associative memory has been identified by the test software as encountering a hard error, then the software can guarantee that the location is permanently allocated a corresponding error recovery entry so that subsequent accesses to the corresponding address are serviced using the error recovery entry rather than using any value stored in the location that encountered the hard error.

The techniques described above can be applied to a number of different types of non-associative memory. In one example the non-associative memory may comprise a tightly coupled memory (TCM). For a tightly coupled memory, there may be a one-to-one mapping between the address specified in a request issued to the tightly coupled memory and the corresponding physical location at which information corresponding to that address may be stored. A tightly coupled memory may be a form of memory which provides predictable latency for accesses to certain data or code. An alternative for a tightly coupled memory is a cache, which caches a subset of information from a larger data store such as a further cache or main memory. With a cache, the occupancy of the cache may constantly be changing under control of cache control hardware, without there being specific requests from the processing pipeline to specify which particular addresses are to be allocated in the cache. Instead the cache control hardware may use a cache eviction policy which attempts to track accesses to the underlying memory system and populate the cache with those addresses predicted to be most likely to be needed in future. For example, a cache can be implemented using a least recently used scheme where the addresses most recently accessed have their information cached in the cache and less recently accessed addresses, if accessed again after eviction from the cache, will need to have the corresponding information fetched in from a further data store. In contrast, for a tightly coupled memory, once information has been allocated to a tightly coupled memory by a write request issued by the processing pipeline, that information is guaranteed to be retained in that memory. Hence, for a tightly coupled memory, unless power is removed from the tightly coupled memory or an uncorrectable error occurs due to a soft or hard error as discussed above, then once data has been written to a given address of the tightly coupled memory, then that data will remain stored in the tightly coupled memory until a further write request overwrites the physical location associated with that address. Tightly coupled memories can be useful for storing certain performance-critical code or data for which a predictable latency is needed. It is possible to provide a shared tightly coupled memory which can store both instructions or data, or provide a dedicated tightly coupled memory dedicated to storing data only or instructions only. Some systems may have both an instruction tightly coupled memory and a data tightly coupled memory, and the error recovery storage discussed above could be applied in a shared manner to both types of tightly coupled memory, or separate error recovery storage may be provided for the instruction tightly coupled memory and the data tightly coupled memory respectively.

Alternatively, in other examples the error recovery techniques described above could be applied where the non-associative memory comprises a direct-mapped cache. Hence, in this case the direct-mapped cache may be provided with error recovery storage and the control circuitry as described above. A direct-mapped cache may have a many-to-one mapping between the address specified in the read/write request signal sent to the cache and the physical location in which the information associated with the address is stored. Hence, with a direct-mapped cache, multiple different addresses all share the same physical storage location and so that storage location can be used to store any information associated with any of those multiple addresses, but nevertheless similar to the tightly coupled memory, for a given address there is only one single physical location in the direct-mapped cache that is allowed to store the data for that particular address. Unlike the tightly coupled memory, a direct-mapped cache would not provide a guarantee that once data or instructions are allocated to the direct-mapped cache they will remain there indefinitely. Instead the direct-mapped cache may cache a subset of information from a further cache or memory, with the occupancy of the direct-mapped cache being controlled by cache control hardware using an eviction policy such as least recently used, round robin etc. Hence, it is possible that an access to one address corresponding to a given physical location could cause eviction of data previously allocated to that physical storage location for another address aliasing to the same physical location.

Figure 1:
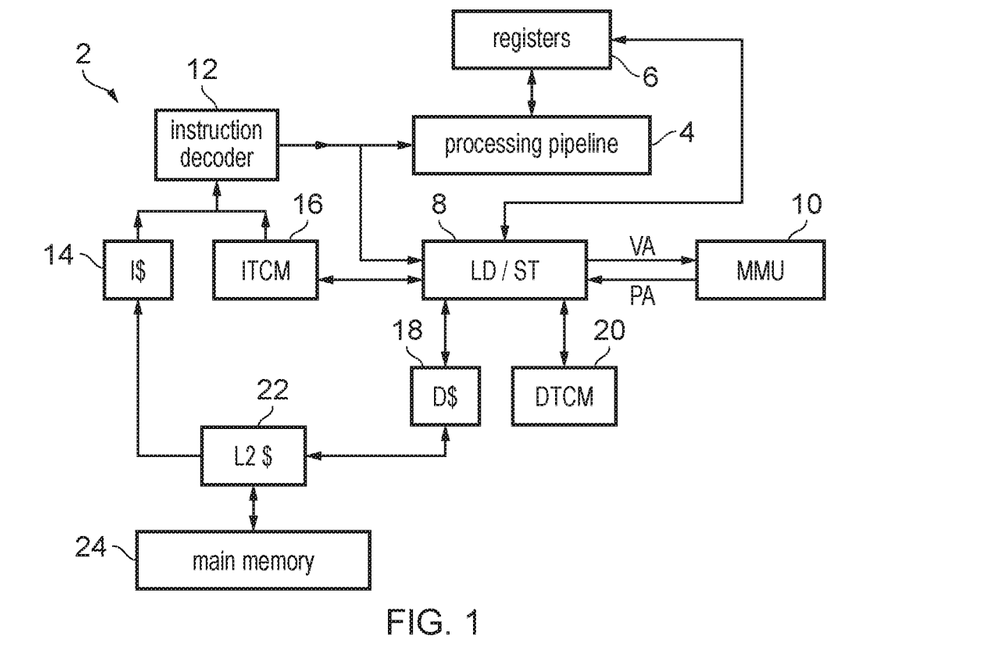
FIG. 1 schematically illustrates an example of a data processing apparatus having at least one non-associative memory.

FIG. 1 schematically illustrates an example of a data processing apparatus 2 for performing data processing in response to program instructions. The apparatus has a processing pipeline 4 which includes execution units for performing data processing operations such as arithmetic operations, branch operations, etc., with reference to data stored in registers 6. The apparatus also has a load/store unit 8 for performing load operations to load data from a memory system to the registers 6 or store operations for storing data from the registers 6 to the memory system. A memory management unit (MMU) 10 is provided for controlling access to the memory system. The MMU 10 controls address translations between a virtual address (VA) specified by instructions processed by the pipeline 4 and a physical address (PA) identifying corresponding storage locations within the memory system, and performs access control for determining whether the processing pipeline 4 is allowed to access information for a given virtual address. The processing pipeline 4 and load/store unit 8 are controlled based on signals generated by an instruction decoder 12 when decoding program instructions fetched from the memory system for execution.

The memory system in this example includes an instruction cache 14, an instruction tightly coupled memory (ITCM) 16, a data cache 18, a data tightly coupled memory (DTCM) 20, a shared level two cache 22 shared for both data and instructions, and main memory 24 which provides further storage which may include some off-chip storage on a separate system on chip to the rest of the apparatus 2.

The main memory 24 stores both the instructions of the program code to be executed by the apparatus 2 and data to be accessed when executing the code. The instruction cache 14 caches instructions of the program code to be executed, while the data cache 18 caches data requested by load/store instructions processed by the load/store unit. In this example, the level 2 cache 22 is shared between data and instructions, although other cache hierarchies could be used and this is just one example.

In this example, in addition to the instruction and data caches 14, 18 which provide faster access to a subset of data stored in the memory system 24, the system also includes the ITCM 16 and DTCM 20, which provide predictable-latency access to a certain critical set of software or data which is written to these memories under control of the load/store unit 8. While FIG. 1 shows the TCM separated into separate instruction and data TCMs 16, 20, this is not essential and other examples could provide a single TCM shared between instructions and data. Alternatively, other implementations could only provide one of the ITCM 16 and DTCM 20, with no TCM provided for the other of the instructions and data.

The TCMs 16, 20 are examples of a non-associative memory, for which any given physical address issued to the TCM 16, 20 by the load/store unit 8 corresponds to a single physical location in the TCM 16, 20, whereas the caches 14, 18 may be implemented as associative memories using a set-associative or fully-associative allocation policy for which data from a given physical address can be stored at any of two or more different physical locations of the cache.

Figure 2:
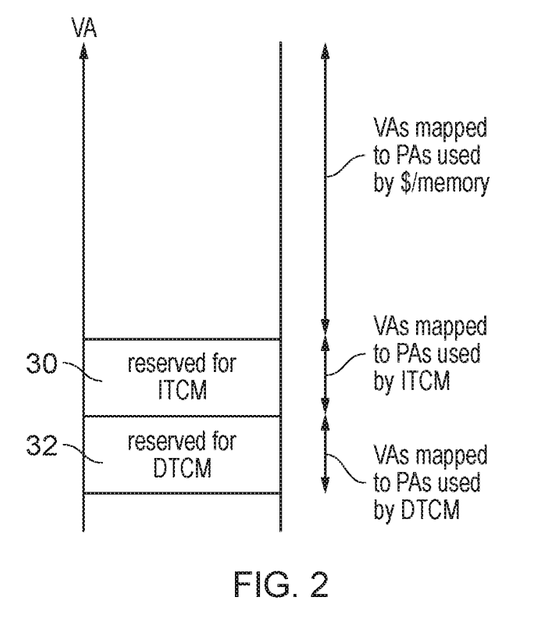
FIG. 2 shows how a portion of an address space can be reserved for mapping to the non-associative memory.

As shown in FIG. 2, the virtual address space used by the instructions in the processing pipeline may have certain portions of the address space reserved for mapping to the ITCM 16 or DTCM 20 respectively. The reserved portions could be fixed in hardware, or could be programmable. For parts of the virtual address space outside the portions 30, 32 reserved for the TCMs, virtual addresses in those portions may be mapped to physical addresses in a physical address space used by the caches 14, 18, 22 and the main memory 24 to identify the location of the corresponding information. The virtual addresses in the portion 30 reserved for the ITCM 16 may be mapped to a physical addressing scheme used by the ITCM 16. The virtual addresses in the portion 32 of the address space reserved for the DTCM 20 may be mapped to physical addresses used in an addressing scheme used by the DTCM 20. The ITCM 16 and DTCM 20 may use different physical addressing schemes or the same physical addressing scheme, but may not have a corresponding shared physical address space so that the same physical address value could be used both for a particular location in the ITCM 16 and also for a particular location in the DTCM 20, since accesses to the ITCM 16 and DTCM 20 may be requested over separate physical interfaces so that it is not necessary to distinguish the address values sent to the respective memories 16, 20. Similarly, the physical address value which refers to a given physical location in one of the TCMs 16, 20 also could be used to refer to data in the cache/memory system 14, 18, 24, as again a separate physical request interface could be used to route requests to these memories.

Hence, while the use of virtual-to-physical address translation within the MMU 10 may mean that a given virtual address could be mapped to any location within the DTCM 20 depending on the current virtual-to-physical address translation mappings defined by page tables accessible to the MMU 10, for each TCM 16, 20, for any given physical address there is only one location in that TCM 16, 20 that could be used to store the information for the given physical address. This means that the TCMs 16, 20 are more likely to be prone to failure due to hard errors than the caches. For the caches 14, 18 which implement an allocation policy with a certain degree of associativity, then if one physical location which could be used for storing the information associated with a given physical address encounters an error, it is still possible to allocate the corresponding physical address to another physical location in the set of locations that is allowed to be selected for that particular address, so that the error can be patched and forward progress can still be made within the cache.

Figure 3:
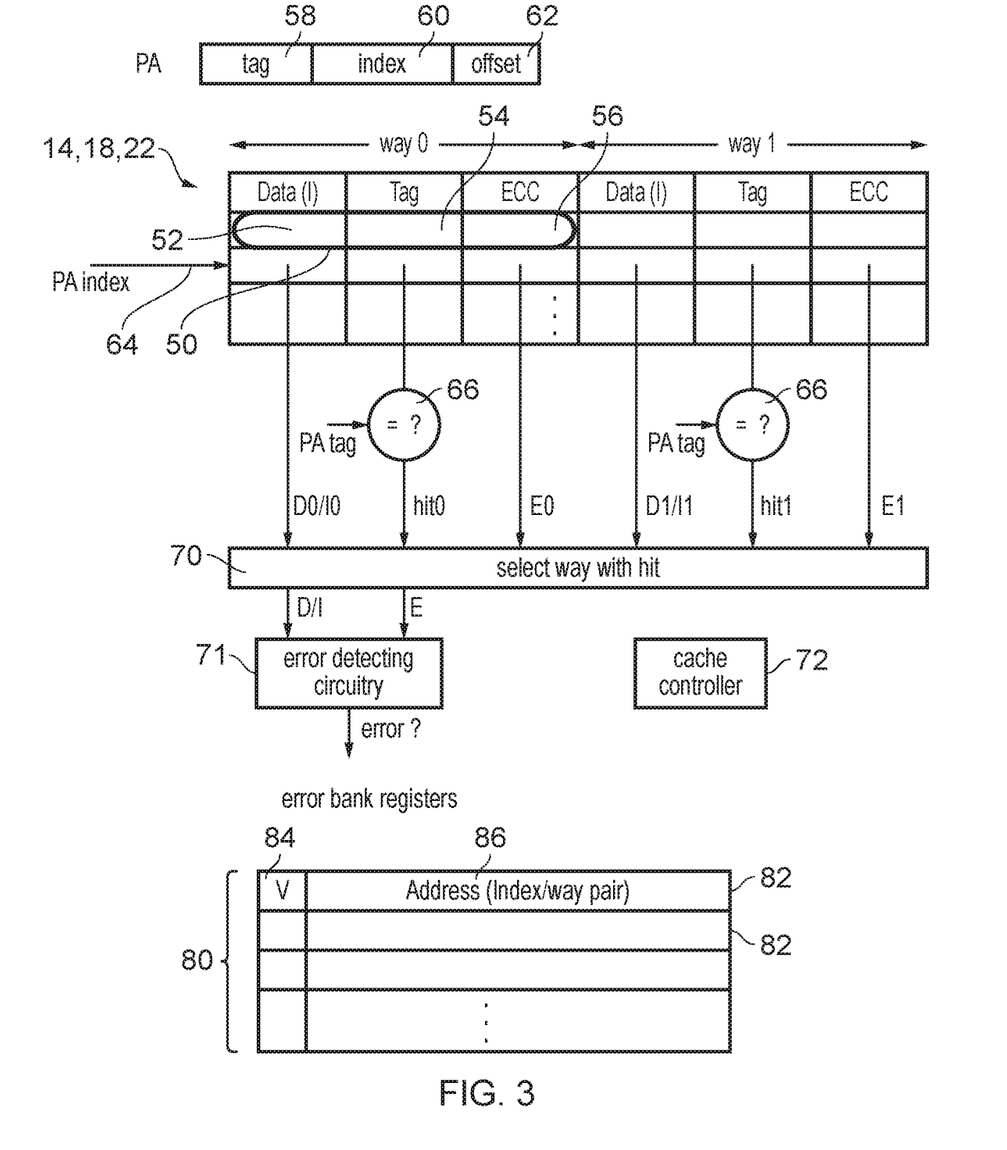
FIG. 3 shows, for comparison, an example of providing error recovery storage for an associative memory.

An example of handling such hard errors within the caches 14, 18, 22 is shown in FIG. 3. FIG. 3 shows a cache which could be any one of these caches 14, 18, 22. The cache is implemented as a set-associative cache, in this example as a two-way set associative-cache, so that any given physical address can have its data or instructions stored in one of two alternative locations within the cache. Each cache entry 50 in this example specifies the data value or instruction 52 to be stored, a tag value 54 and an error correction code (ECC) 56. A physical address supplied to the cache includes a tag portion 58, an index portion 60 and an offset portion 62. The index portion 60 of the physical address is used to derive an index value 64 which identifies the set of locations in which the corresponding data or instructions may be stored. In this example the set of locations includes two locations, way 0 and way 1. For a read operation, the data/instructions 52, tag 54 and ECC 56 are read from each of the indexed set of locations. The tags 54 read from each location are compared with the tag portion 58 of the supplied target physical address by comparators 66, which each generate a hit signal indicating whether the tag 52 stored in the corresponding cache entry matches the tag portion 58 of the supplied target address. If a hit is detected in either of the ways of the index set, then the corresponding data value or instruction is selected by a selector 70. If neither of the entries in the indexed set detects a hit then a cache miss is detected, and then a linefill request is issued to a further cache or memory to request the required information, and a new entry is allocated in the indexed set (evicting a previous entry if necessary). When one of the selected entries in the index set detects a hit, then the error correcting code 56 of that entry can be used to detect whether there is an error in the stored data value or instruction. Depending on the type of error correcting code used, if any error is detected then this potentially may also be corrected, to update the contents of the corresponding entry with the corrected value. Alternatively, if an error detecting code which is incapable of error correction is used instead of an ECC 56, or the detected error is a multi-bit error which may not be correctable by some types of error correction code, then the error could simply be signalled without attempting to correct the error. This lookup process may be controlled by a cache controller 72, which is a hardened logic circuit for controlling cache lockups, eviction and allocation. The offset portion 62 of the physical address supplied as the target address identifies which particular part of the data or instructions stored in the cache entry were required to handle the read request or are required to be updated on a write request.

As shown in FIG. 3, for handling hard errors in a cache or other associative memory, it is possible to provide a set of error bank registers 80, where each register 82 specifies a valid bit 84 and an address 86 which identifies an index/way pair of an individual cache entry 52 of the cache. When an error is detected in a given entry 52 of the cache, then an error bank register 82 may be allocated corresponding to that entry, and the address 86 of that error bank register 82 is updated to specify the index/way pair of the erroneous cache entry, and the corresponding valid bit 84 in that newly allocated error bank register is set. Subsequently, if there is a read request which misses in the cache, then when the corresponding data is fetched from a further level cache or from main memory, then when allocating a new entry to store that fetch data, if there is one of the indexed set of entries which has its address 86 identified in an error bank register, then that cache storage location may be excluded from being selected as the victim entry to which the fetch data is to be allocated. Hence, the potential hard error which occurred in a particular storage location of the cache can be dealt with on subsequent allocations, by avoiding allocating to that entry and instead selecting one of the other entries in the indexed set of entries. While this may reduce performance because it may increase the frequency of cache misses for physical addresses mapping to a set of entries for which one of the entries is erroneous, it nevertheless allows forward progress to be maintained.

However, the approach shown in FIG. 3 does not work for a non-associative memory such as the ITCM 16 or DTCM 20, because for these memories a piece of information associated with a given physical address can only be stored in one physical location in the memory 16, 20 and so it is not possible to reallocate that information to a different location as in the cache example shown in FIG. 3.

Figure 4:
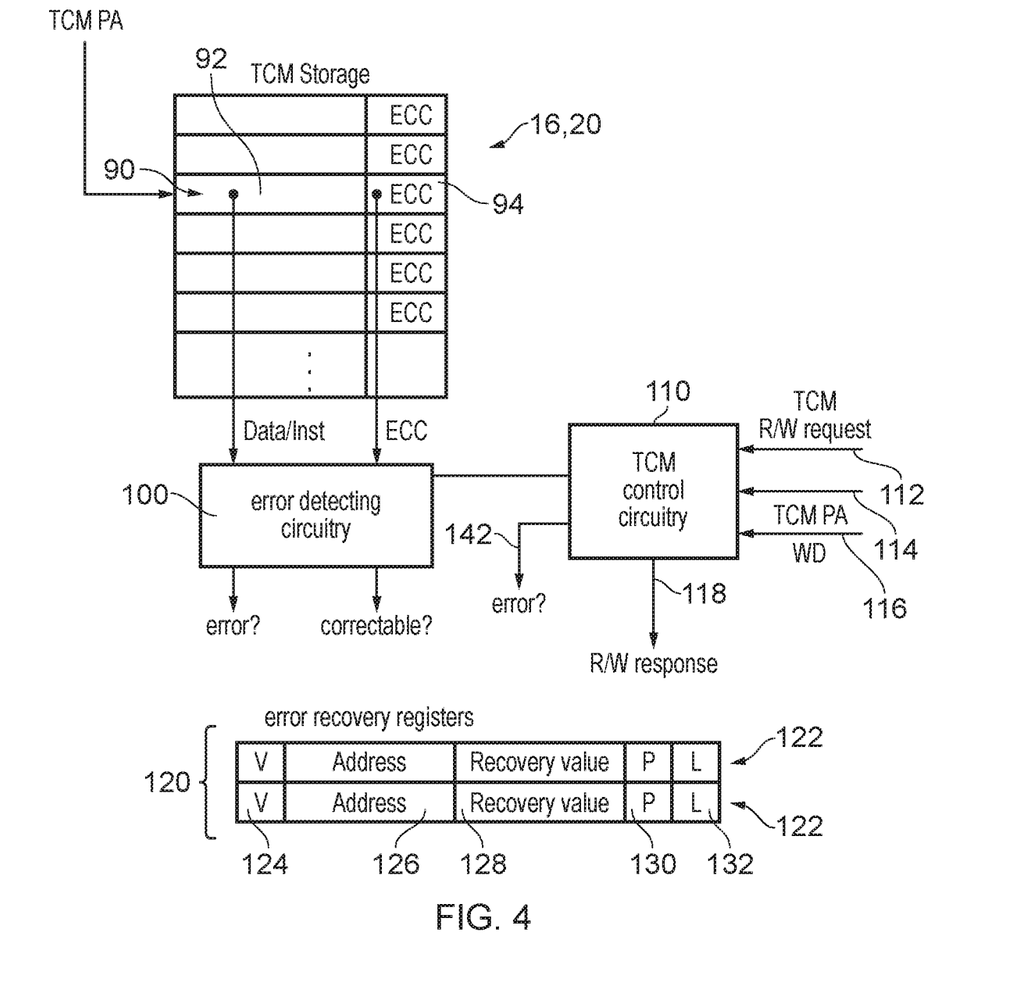
FIG. 4 shows an example of providing error recovery storage for recovering from hard errors in a non-associative memory.

FIG. 4 shows an approach for handling error recovery for a non-associative memory 16, 20. Although this example applies this technique to the ITCM 16 or DTCM 20, it would also be possible to use a similar technique for a direct-mapped cache which is also an example of a non-associative memory. For the non-associative memory, the indexing scheme on a read or write request is simpler than for the cache as the physical address simply identifies one particular location 90 of the TCM 16, 20. In response to a read request, the contents of that location including a stored value 92 (data or instructions) and error correcting code 94, are simply read out. It is not necessary to compare tags as in the example of FIG. 3. Error detecting circuitry 100 may use the error correcting code 94 to check whether an error has arisen in the corresponding information value 92. On writing data or instructions to the TCM, the stored error correcting code 94 may be computed as a function of the value being written and when reading data from the TCM 16, 20, the error detecting circuitry 100 may calculate what the error correcting code corresponding to the stored value 92 should be, and then compare it with the stored error correction code 94 and if there was a mismatch this may seem on the presence of an error. While FIG. 4 shows the error correcting code 94 as a separate value from the corresponding information value 92, it would also be possible to use an encoding where a single combined encoding represents both the stored value and its corresponding error correcting code, where these are not allocated to distinct subsets of bits within the storage. If a detected error is correctable then the error detecting circuitry 100 may identify what the correct value should be and write the error-corrected value back to the storage location.

However, sometimes the error may have been caused by a hard error caused by a physical fault within the circuitry of the access storage location, and so even if the error is correctable this may not address the fault. The non-associative memory 16, 20 is provided with control circuitry 110 and a set of error recovery registers 120 for storing error recovery entries 122 for addressing such hard errors and enabling the device 2 to continue to operate for some time after such hard errors have arisen. In this example, the number of error recovery entries 120 provided is 2, but in other examples a greater number could be provided, or alternatively just a single error recovery entry could be provided. Each error recovery entry 122 in the error recovery storage 120 includes a number of fields, including a valid field 124 for specifying a validity indicator, an address field 126 for specifying an address of a storage location 90 of the non-associative memory 16, 20 which corresponds to the error recovery register 122, a recovery value 128 which can be used to respond to read requests in place of the corresponding information 92 stored in the corresponding location of the non-associative memory 16, 20, at least one poison field 130 for storing a poison value for marking at least one part of the recovery value as 128 as unusable or usable, and a lock field 132 which indicates whether a corresponding error recovery register 122 has been locked by software to prevent eviction. While the example of FIG. 4 shows all of the fields 124, 126, 128, 130, 132 being stored within a single register 122, in other examples each error recovery entry 122 may be split into multiple separate registers. For example, if the register width is such that it is not possible to fit all of the information in one register then each error recovery entry 122 of the error recovery storage 120 may require two or more registers. In this particular example, a single poison field 130 is provided to indicate the usability of the entire recovery value 128. Optionally, in addition to the information value 92 of the erroneous storage location itself, the recovery value 128 may also include an error correcting code, which could help guard against errors arising in data stored in the error recovery entry. Also, while not illustrated in FIG. 4, information such as the valid field 124 or poison field 130 could be stored redundantly using multiple identical bits, to guard against errors arising in these fields. In this case, on reading the valid field 124 or poison field 130, each of the redundant bits would be read and compared with each other to detect whether an error has occurred—if there are two redundant bits then an error would be flagged if the bits are different, while if there are three or more redundant bits then majority voting could be used to select the value held by two or more of the bits as the actual valid/poison bit value to be used.

The TCM control circuitry 110 responds to TCM read and write requests issued by the load/store circuitry 8 using the information specified in the error recovery storage 120 and in the TCM physical storage itself. For a TCM read request, the TCM control circuitry receives request type indicator 112 distinguishing the read request from a write request, and a target address 114 identifying the storage location 90 of the TCM 16, 20 to be read. For a TCM write request, as well as the request type indicator 112 distinguishing the write request from the read request and the target address 114, the write request also provides a write value 116 to be written to the identified storage location. In response, the TCM control circuitry 110 uses the information in the TCM storage and the error recovery storage 120 to provide a read or write response 118. For a read request the read response 118 may provide data read from either the corresponding TCM storage location 90 or a corresponding error recovery entry 122, while for a write request the write response 118 may provide an indication that the write was successful. Based on error detection by the error detecting circuitry 100, the TCM control circuitry 110 may also signal that an error has occurred, for example by generating a signal 142 that signals an interrupt or exception.

Figure 5:
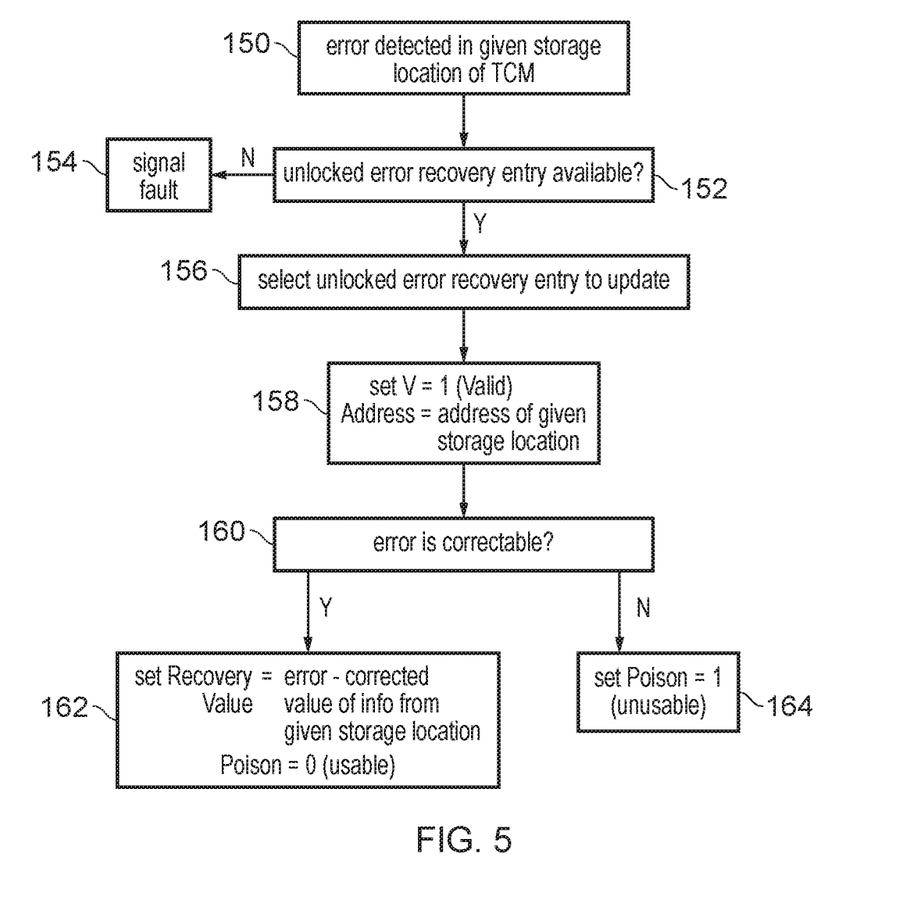
FIG. 5 is a flow diagram showing a method of providing error detection for the non-associative memory.

FIG. 5 is a flow diagram showing a method for dealing with errors detected using the error detecting circuitry 100. At step 150, the error detecting circuitry 100 detects that an error has arisen in a given storage location 90 in the TCM 16, 20. This may have been detected by a comparison of the stored error correcting code 94 and the expected error correcting code which would have been expected to be stored if there had been no error in the stored data or instruction value 92.

At step 152 the control circuitry 110 determines whether there is an unlocked error recovery entry available in the error recovery storage 120. Software may set the lock field 132 of a particular error recovery entry 122 to lock it to prevent eviction. This may be done based on a software test library executed by the processing pipeline 4 which may probe whether particular storage locations of the TCM have encountered a hard error by issuing a pattern of read and write accesses designed to check whether an error repeatedly occurs in the same storage location. If there are no unlocked error recovery entries available then at step 154 the TCM control circuitry signals a fault. At this point, it is likely that the device is no longer able to continue operating as the TCM can no longer guarantee correct responses.

If there is an unlocked error recovery entry available then at step 156 the control circuitry 110 selects one of the unlocked error recovery entries to update. This selection may be based on an eviction policy, such as least recently used or round robin. At step 158 the control circuitry 110 updates the valid field of the selected unlocked entry to indicate that this entry is valid and updates the address field 126 of that entry to specify the address of the given storage location 90 of the TCM 16, 20 in which the error was detected. At step 160 the error detecting circuitry 100 or TCM control circuitry 110 determines whether the error is correctable, and if it is correctable, the error detecting circuitry 100 determines the error-corrected value which the information in the given storage location should have had, based on the combination of the stored value 92 and the error correcting code 94. At step 162, the error-corrected value is written as the recovery value 128 in the newly allocated error recovery entry that was selected at step 156, as well as being written to the corresponding TCM storage location 90 that encountered the error. Also the poison field 130 in the newly allocated error recovery entry is set to 0 to indicate that this recovery value 128 is usable for servicing read responses. If at step 160 the error was determined to be uncorrectable then at step 164 the poison field 130 is set to 1 to indicate that the recovery value is unusable.

Figure 6:
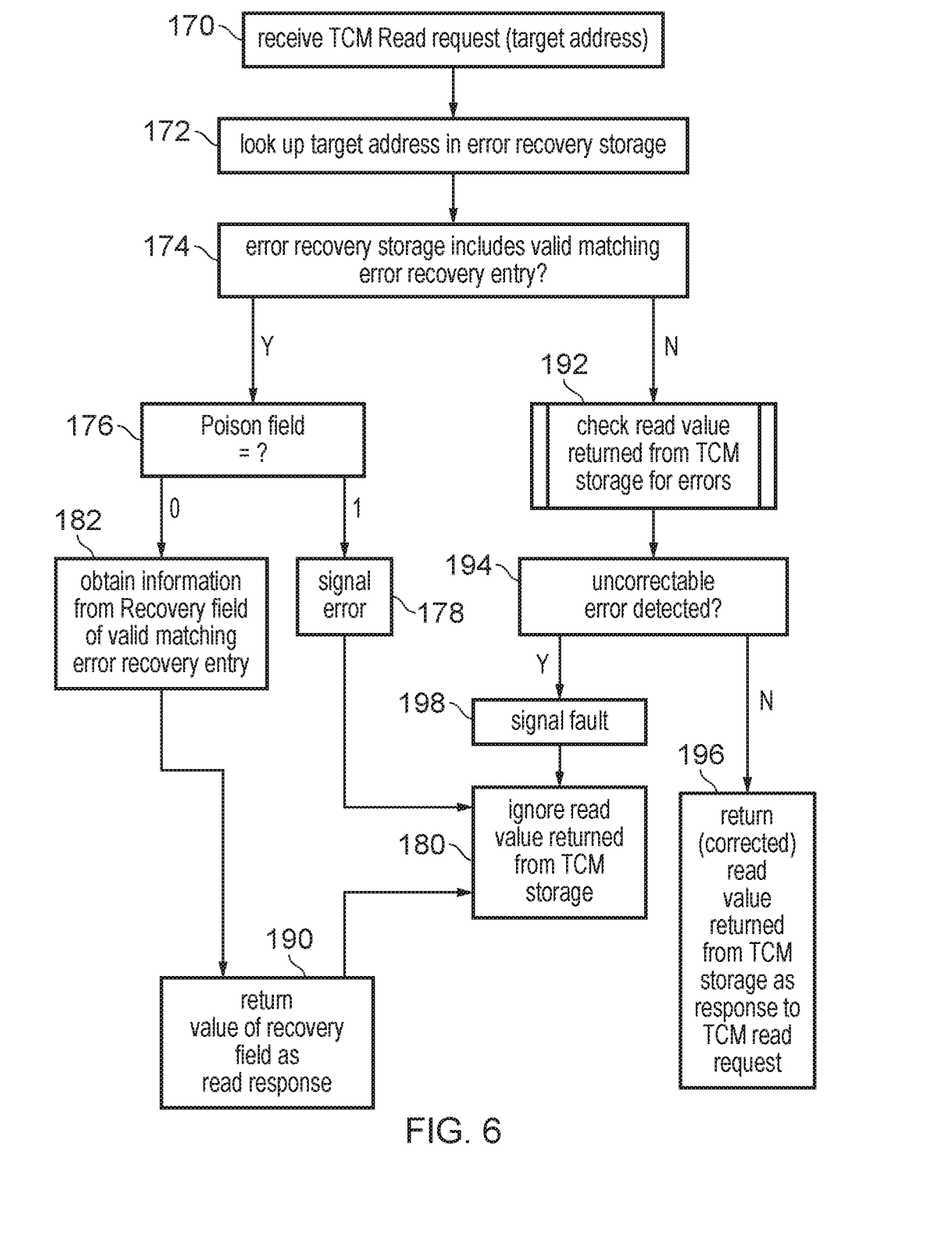
FIG. 6 is a flow diagram showing a method of processing a non-associative memory read request.

FIG. 6 is a flow diagram showing handling of a TCM read request by the TCM control circuitry 110. At step 170 the TCM read request is received specifying a given physical address as its target address 114. At step 172 the TCM control circuitry 110 looks up the specified target address in the error recovery storage 120, comparing the target address against the address field 126 of each error recovery register 122 and checking whether the valid field 124 of the error recovery register is set. At step 174 the control circuitry 110 determines whether the error recovery storage includes a valid matching error recovery entry, for which the valid field 124 is set at to 1 and for which the address field 126 matches the target address of the read request. If so, then at step 176 the control circuitry 110 determines the value of the poison field 130 of the valid matching error recovery entry. If the poison field is 1, then at step 178 the TCM control circuitry 110 signals an error using the error signal 142, and at step 180 if any read value is returned from the TCM storage then this is ignored. In some implementations the TCM storage may be looked up in parallel with the error recovery registers to speed up the processing in cases where there is no error, so when the error recovery storage includes a valid matching error recovery entry, the read value returned from the TCM storage is ignored and the return of this read value may be suppressed to the load/store unit 8.

On the other hand, if the poison field was 0 at step 176, to indicate that the recovery value of the valid matching error recovery entry is usable, then at step 182 the control circuitry 110 obtains the information from the recovery field 128 of the valid matching error recovery entry. At step 190 a value of the recovery field is returned as the read response 118 to the TCM read request 112. Also, at step 180 any read value returned from the TCM storage itself is ignored because the read has been serviced instead using the recovery value 128 from the valid matching error recovery entry.

Optionally, in some implementations the recovery field of the error recovery entry may itself be protected against errors by storing redundant copies of the recovery value, or by providing an error detecting code or error correcting code associated with the recovery field. In this case, step 182 may also include detecting whether an error has arisen in the stored recovery value, and if it is possible to correct the error, step 190 may return the error-corrected value of the recovery field as the read response, while if it is not possible to correct the error then a fault may signalled instead of returning a valid read response. However, in other implementations, the circuit area and power overhead of providing the logic for calculating and comparing error detection/correction codes or storing redundant information may not be considered justified for the error recovery storage, given the relatively low probability of errors arising in the error recovery storage compared to the probability of an error arising in the ITCM 16 or DTCM 20 due to the larger storage capacity of the ITCM 16 or DTCM 20.

In contrast, if at step 174 it was determined that the error recovery storage 120 did not include a valid matching error recovery entry corresponding to the target address, then at step 192, once the read value 92 is returned from the corresponding storage location 90 of the TCM storage, it is checked for errors, using the method shown in FIG. 5. FIG. 5 shows the steps for controlling updating of the error recovery storage 120 based on the error. However, as this has been triggered by a read request then also a response is required to the read request, and the subsequent steps at FIG. 6 after step 192 show handling of this response. At step 194 it is detected whether any uncorrectable error has been detected at step 192. If not, then the value 92 returned from the corresponding physical location of the TCM storage (corrected based on the error correcting code if necessary) is returned as a response to the read request at step 196. If an uncorrectable error is detected then at step 198 a fault is signaled as no correct response to the read request is possible and then at step 180 again the read value returned from the TCM storage is ignored because it was found to be erroneous.

Figure 7:
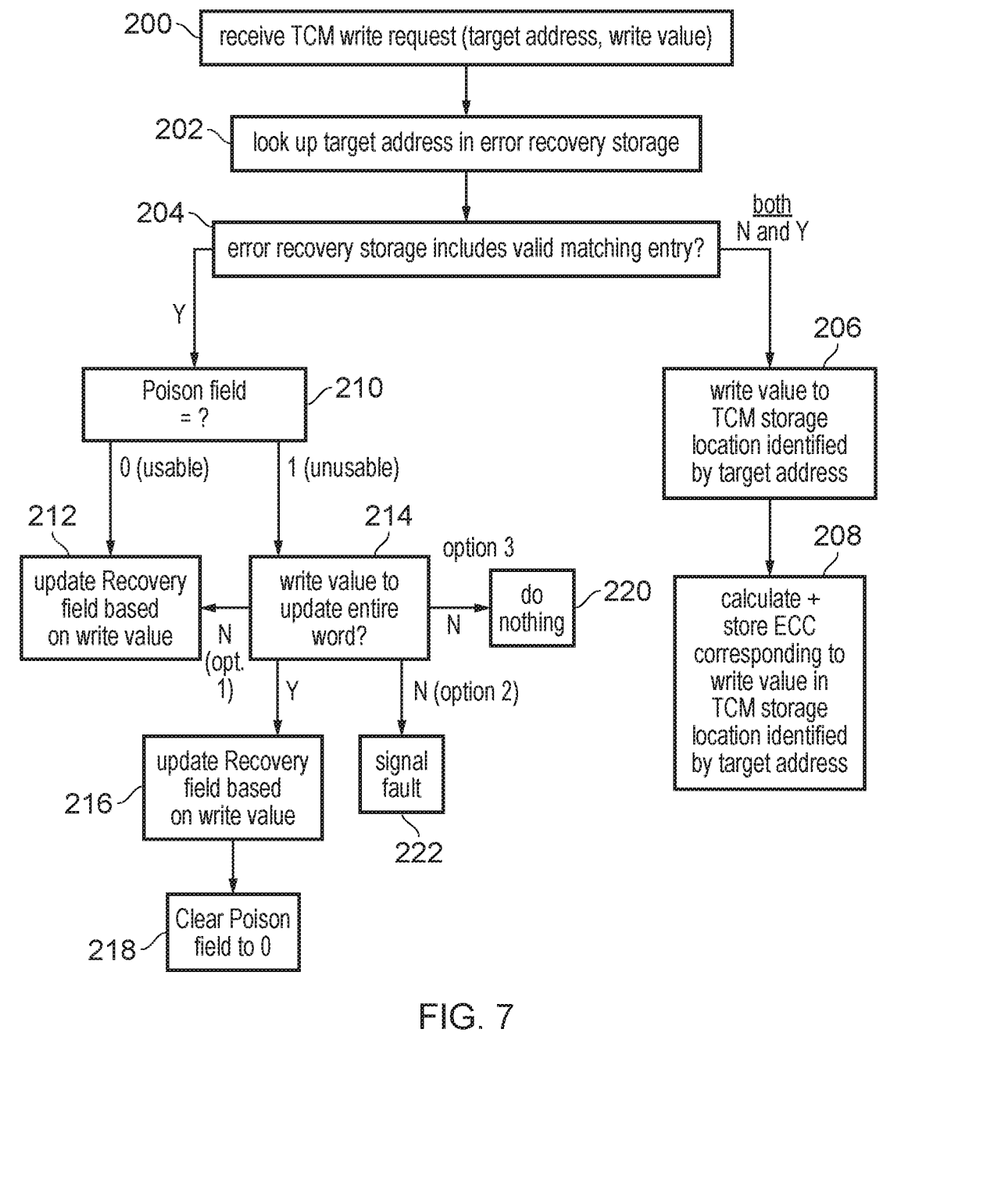
FIG. 7 is a flow diagram showing a method of processing a non-associative memory write request.

FIG. 7 shows handling of a TCM write request which specifies a target address of a particular storage location of the TCM storage and specifies write value to be written to that location. At step 202 the control circuitry 110 looks up the target address in the error recovery storage 202, and compares the valid and address fields 124, 126 of each entry. At step 204 the control circuitry controls whether the error recovery storage 120 includes a valid matching entry corresponding to the target address, for which the valid field 124 is set to 1 and the address field 126 is equal to the target address. If there is no valid matching entry for the matching target address, then at step 206 the write value is written to the corresponding physical location 90 of the TCM storage which is identified by the target address and at step 208 the corresponding error correcting code 94 is calculated and stored in the corresponding location of the TCM. In this case there is no need to update the error recovery storage 120 as the fact that there was no valid matching entry indicates that no previous error has been detected for this particular physical location, or if any such error was detected, that the corresponding entry has since been overwritten to make way for another error recovery entry.

Steps 206 and 208 are also performed if the error recovery storage includes the valid matching entry for the target address. Hence steps 206 and 208 are performed regardless of whether the target address hits in the error recovery storage.

If the error recovery storage does include a valid matching entry for the target address, then in addition to performing steps 206 and 208, a further branch of the method is performed as shown in steps 210 to 222. It will be appreciated that steps 210 to 222 could be performed either in parallel with steps 206 and 208, or sequentially with one of the branches of the flow diagram being performed before the other.

When the error recovery storage includes a valid matching entry then at step 210 the control circuitry checks the poison field 130 of the valid matching entry. If the poison field is 0 then this indicates that the corresponding recovery value 128 is useable, and so at step 212 that recovery field 128 is updated based on the write value specified in the TCM write request. Some write requests may update an entire data word while other data requests may specify that only part of the data word is to be updated, e.g. the request may be a half word or byte write operation. When the recovery value is updated, a corresponding ECC is also calculated and stored as part of the recovery value 128.

If at step 210 the poison field was found to be equal to 1 indicating that the value is unusable, then at step 214 the control circuitry 110 identifies whether the write request is requesting that the entire data word associated with the target address is to be updated. If so, then at step 216 the recovery field 128 of the valid matching entry is updated based on the write value, and at step 218 the poison field 130 is cleared to 0. This is because even though the corresponding physical location may have encountered an uncorrectable error in the past, as the entire data word of the corresponding address is now being updated, then any previously uncorrectable error has now been eliminated, and so the poison field can be cleared so that subsequent reads may be handled without error by reading the recovery value from the corresponding entry of the error recovery storage 120. On the other hand, if at step 214 it is determined that the write request targets only a partial data word, then there are several options for how to respond. One option is to do nothing as shown in step 220. Another option is to signal a fault, as it is not possible to handle the error as shown in step 222. Another option is that the write value is still written to the recovery value 128 at step 212, the same as if the poison field had not been set. Even though the write value is unusable, simply writing the recovery field regardless of the poison field may in some implementations be simpler to implement in circuit hardware. However, when a partial word is omitted then step 218 of clearing the poison field is omitted.

Hence, in summary, the techniques discussed above provide a way to enable a device to continue operating even in the presence of multiple uncorrectable hard errors. In one example, multiple error bank registers are provided, with each register comprising the following fields: Valid bit, Address, Data, Poison bit, Lock bit.

If an ECC error is detected, then an unlocked error bank register is updated with information about that error: the valid bit is set; the address gives the address of the error; if the error is correctable, the data is set the corrected data at that location; and if the error is uncorrectable, the poison bit is set (to indicate that the data at this address has been corrupted). Only software can update the lock bit, e.g. by issuing a memory write request to a certain memory address mapped to a given error bank register, or by issuing dedicated instructions for setting/clearing lock bits.

If a read matches the address in an error bank register, and the poison bit is not set, the read gets the data from the error bank register, and ignores the response of the memory. If a read matches the address in an error bank register, and the poison bit is set, the read gets an error, and ignores the response of the memory.

If a write matches the address in an error bank register, the write updates the data field of the register in addition to updating the memory. Additionally, if the write updates the entire contents of the data field, then the poison bit is cleared (to indicate that the data at the address can be trusted).

By this means, it is possible to 'patch over' hard errors in the memory, as the device accesses the error bank registers instead of the memory. The device can continue to operate so long as the combined number of hard errors in the non-associative memory and in the error bank registers themselves does not exceed the number or error bank registers.

The lock bit allows the device, once hard errors have been detected, to restore the contents of the error bank registers on boot up, and then lock those locations, so that they are not overwritten by the automatic sequence. That is, software may, on setting the lock bit for an error bank register identified as corresponding to a non-associative memory location that encountered a hard error, store the contents of the locked error bank register to memory so that it can be restored on booting up the device.

Figure 8:
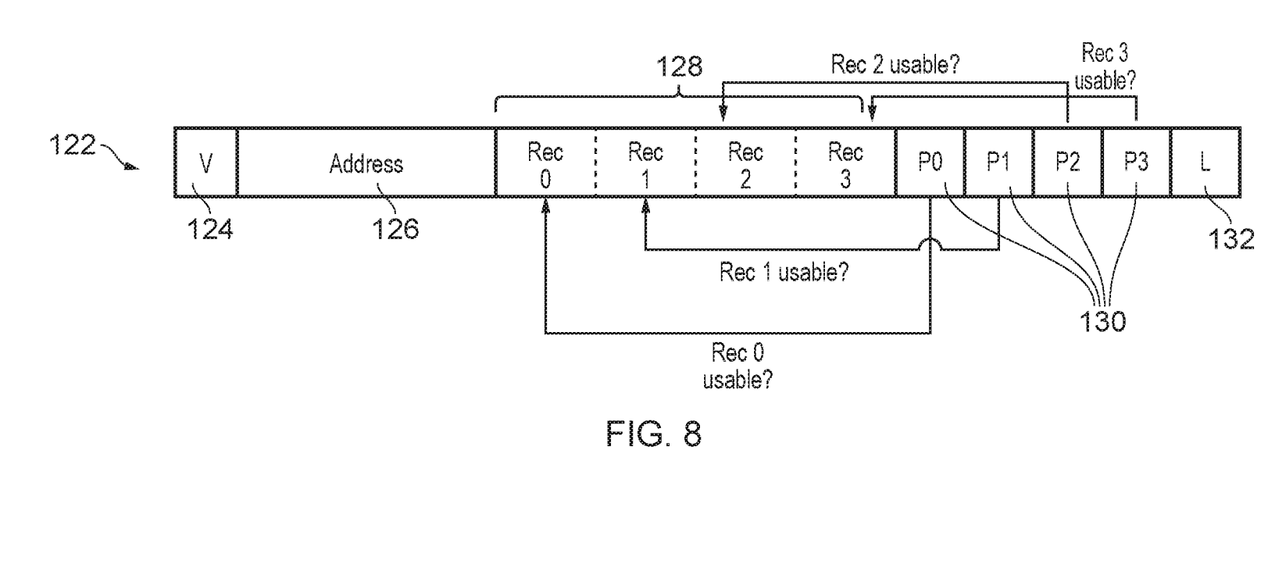
FIG. 8 shows an alternative implementation of an error recovery entry in which multiple poison fields are provided corresponding to respective portions of a recovery value.

While FIG. 4 shows an example where each error recovery entry 122 has a single poison field 130 which corresponds to the entire recovery value 128, as shown in FIG. 8 another approach may be that the error recovery entry 122 includes multiple poison fields 130 each corresponding to a respective portion of the recovery field 128. In this case, each portion of the recovery value is separately indicated as usable or unusable. This can increase the likelihood that if a write access overwrites just one portion of a recovery value, the corresponding poison value can be cleared and then subsequent reads which only require a subset of the portions of the recovery value may be more likely to be able to be correctly serviced based on the usable portions of the recovery value, even if other portions of the recovery value are still unusable. With such implementation, the methods shown in FIGS. 5 to 7 may still be the same, except for the following modifications.

At steps 162 and 164 of FIG. 5, each of the poison fields may be set to 0 or 1 respectively. Alternatively, if a form of error correcting code is used where separate error correcting codes are provided for each portion of the information 92 stored in a given TCM location 90, then individual portions of the corresponding recovery value 128 may be able to be indicated as usable or unusable in steps 162 and 164, depending on whether the corresponding portion of the value 92 from the TCM location has been identified as including an error and on whether that error is correctable.

In FIG. 6, if the implementation shown in FIG. 8 is used then at step 176 the control circuitry 110 checks the poison fields which correspond to parts of the addressed value which are required for handling the read request (excluding any portions which are not required because the access size is smaller than the overall data width), and if all of the required portions of the recovery value 128 are marked as usable by the corresponding poison fields then the method may proceed to step 182 to read those required portions of the recovery field 128, while if any one of the poison fields 130 corresponding to required portions of the recovery value 128 is set to 1 then the method proceeds to 178 to signal the error.

Similarly, in FIG. 7, at step 210 the relevant poison fields 130 for those portions of the addressed value which are to be overwritten by the write request are checked. Steps 212 to 222 are then performed separately for each portion of the write value, so that for an individual portion, if the write value is to update all of the bits in that particular portion of the corresponding location in the TCM storage, then if the poison field for that particular portion is currently set, it can be cleared at step 218, because now that portion of the recovery value will be error free. On the other hand, if the write does not overwrite all of a portion then it is not possible to clear the corresponding poison field and so one of the options shown in steps 212, 220, 222 is taken.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a non-associative memory comprising a plurality of storage locations;
error recovery storage to store at least one error recovery entry providing a recovery value for a corresponding storage location of the non-associative memory; and
control circuitry responsive to a non-associative memory read request specifying a target address of a storage location of the non-associative memory, when the error recovery storage includes a valid matching error recovery entry for which the corresponding storage location is the storage location identified by the target address, to return the recovery value stored in said valid matching error recovery entry as a response to the non-associative memory read request, instead of information stored in the storage location identified by the target address,
in which each error recovery entry comprises a lock field indicative of whether the error recovery entry is allowed to be evicted from the error recovery storage by the control circuitry.

2. The apparatus according to claim 1, in which in response to a non-associative memory write request specifying a write target address and a write value to be written to the storage location of the non-associative memory identified by the write target address, when the error recovery storage includes a valid matching error recovery entry for which the corresponding storage location is the storage location identified by the write target address, the control circuitry is configured to update at least a portion of the recovery value stored in the valid matching error recovery entry based on the write value specified by the non-associative memory write request.

3. The apparatus according to claim 2, in which each error recovery entry comprises at least one poison field, each poison field indicative of whether a corresponding portion of the recovery value is usable as a response to the non-associative memory read request; and
in response to the non-associative memory write request, when a given poison field of the valid matching error recovery entry indicates that a given portion of the recovery value is unusable, and the non-associative memory write request requests overwriting of all bits within a portion of the storage location corresponding to said given portion of the recovery value, the control circuitry is configured to update said given portion of the recovery value based on the write value and to update the given poison field to indicate that said given portion of the recovery value is now usable.

4. The apparatus according to claim 2, in which in response to the non-associative memory write request, when the error recovery storage includes a valid matching error recovery entry for which the corresponding storage location is the storage location identified by the write target address, the control circuitry is also configured to write the write value to the storage location of the non-associative memory identified by the write target address.

5. The apparatus according to claim 1, comprising error detection circuitry to detect errors in information stored in the non-associative memory.

6. The apparatus according to claim 5, in which in response to detection of an error in information stored in a given storage location of the non-associative memory, when the error detected by the error detection circuitry is correctable and the error recovery storage includes at least one error recovery entry that is updatable by the control circuitry, the control circuitry is configured to update the error recovery storage to provide a valid error recovery entry for which the corresponding storage location is the given storage location and the recovery value is an error-corrected value of the information stored in the given storage location.

7. The apparatus according to claim 5, in which each error recovery entry comprises at least one poison field, each poison field indicative of whether a corresponding portion of the recovery value is usable as a response to the non-associative memory read request; and
in response to detection of an error in information stored in a given storage location of the non-associative memory, when the error detected by the error detection circuitry is uncorrectable, the control circuitry is configured to update the error recovery storage to provide a valid error recovery entry for which the corresponding storage location is the given storage location and the at least one poison field specifies that at least part of the recovery value is unusable.

8. The apparatus according to claim 1, in which the lock field of a given error recovery entry is restricted to being updated by software executed by processing circuitry of the apparatus.

9. The apparatus according to claim 1, in which the non-associative memory comprises a tightly coupled memory.

10. The apparatus according to claim 1, in which the non-associative memory comprises a direct-mapped cache.

11. The apparatus according to claim 1, in which each error recovery entry comprises a validity field and an address field; and
the valid matching error recovery entry comprises an error recovery entry for which the validity field indicates that the error recovery entry is valid and the address field indicates an address matching the target address.

12. An apparatus comprising:
a non-associative memory comprising a plurality of storage locations;
error recovery storage to store at least one error recovery entry providing a recovery value for a corresponding storage location of the non-associative memory; and
control circuitry responsive to a non-associative memory read request specifying a target address of a storage location of the non-associative memory, when the error recovery storage includes a valid matching error recovery entry for which the corresponding storage location is the storage location identified by the target address, to return the recovery value stored in said valid matching error recovery entry as a response to the non-associative memory read request, instead of information stored in the storage location identified by the target address, in which each error recovery entry comprises at least one poison field, each poison field indicative of whether a corresponding portion of the recovery value is usable as a response to the non-associative memory read request.

13. The apparatus according to claim 12, in which the error recovery entry comprises a single poison field for which the corresponding portion comprises the entire recovery value.

14. The apparatus according to claim 12, in which the error recovery entry comprises a plurality of poison fields corresponding to respective portions of the recovery value.

15. The apparatus according to claim 12, in which, in response to the non-associative memory read request, when the at least one poison field of the valid matching error recovery entry indicates that one or more required portions of the recovery value required for responding to the non-associative memory read request are all usable, the control circuitry is configured to return said one or more required portions of the recovery value as the response to the non-associative memory read request.

16. The apparatus according to claim 12, in which, in response to the non-associative memory read request, when the at least one poison field of the valid matching error recovery entry indicates that at least one required portion of the recovery value required for responding to the non-associative memory read request is unusable, the control circuitry is configured to return an error indication.

17. A method for controlling access to a non-associative memory comprising a plurality of storage locations; comprising:

receiving a non-associative memory read request specifying a target address of a storage location of the non-associative memory;

looking up the target address in error recovery storage comprising at least one error recovery entry providing a recovery value for a corresponding storage location of the non-associative memory; and when the error recovery storage includes a valid matching error recovery entry for which the corresponding storage location is the storage location identified by the target address, returning the recovery value stored in said valid matching error recovery entry as a response to the non-associative memory read request, instead of information stored in the storage location identified by the target address, in which each error recovery entry comprises at least one poison field, each poison field indicative of whether a corresponding portion of the recovery value is usable as a response to the non-associative memory read request.

* * * * *